(12) United States Patent
Kapusta

(10) Patent No.: US 9,709,400 B2
(45) Date of Patent: Jul. 18, 2017

(54) SYSTEM, APPARATUS, AND METHOD FOR RESONATOR AND CORIOLIS AXIS CONTROL IN VIBRATORY GYROSCOPES

(71) Applicant: Analog Devices, Inc., Norwood, MA (US)

(72) Inventor: Ronald Alan Kapusta, Bedford, MA (US)

(73) Assignee: Analog Devices, Inc., Norwood, MA (US)

( * ) Notice: Subject to any disclaimer, the term of this patent is extended or adjusted under 35 U.S.C. 154(b) by 128 days.

(21) Appl. No.: 14/680,776

(22) Filed: Apr. 7, 2015

(65) Prior Publication Data

US 2016/0298965 A1    Oct. 13, 2016

(51) Int. Cl.
*G01C 19/56* (2012.01)
*G01C 19/5712* (2012.01)
*G01C 19/5719* (2012.01)

(52) U.S. Cl.
CPC ..... *G01C 19/5712* (2013.01); *G01C 19/5719* (2013.01)

(58) Field of Classification Search
CPC ............ G01C 19/5712; G01C 19/5719; G01C 19/5776; G01C 19/5726
USPC ............... 73/504.12, 504.14, 504.02, 504.04
See application file for complete search history.

(56) References Cited

U.S. PATENT DOCUMENTS

| | | | | |
|---|---|---|---|---|
| 5,218,867 A * | 6/1993 | Varnham | ............ | G01C 19/5691 73/504.13 |
| 5,540,094 A * | 7/1996 | Varnham | ................. | G01P 1/006 73/1.37 |
| 5,889,193 A * | 3/1999 | Pfaff | ..................... | G01C 25/005 73/1.37 |
| 5,987,984 A * | 11/1999 | Artzner | .............. | G01C 19/5691 73/497 |
| 6,510,737 B1 * | 1/2003 | Hobbs | ................ | G01C 19/5607 73/1.37 |
| 6,598,455 B1 * | 7/2003 | Gutierrez | ........... | G01C 19/5719 73/1.77 |

(Continued)

FOREIGN PATENT DOCUMENTS

| | | | | |
|---|---|---|---|---|
| CN | 102620726 | | 8/2012 | ............. G01C 19/56 |
| EP | 2 657 648 A2 | | 10/2013 | ......... G01C 19/5719 |
| WO | WO 01/79862 | | 10/2001 | |

OTHER PUBLICATIONS

Ayazi et al., "Design and Fabrication of a High-Performance Polysilicon Vibrating Ring Gyroscope", Center for Integrated Sensors and Circuits, Eleventh IEEE/ASME International Workshop on Micro Electro Mechanical Systems, Heidelberg, Germany, Jan. 25-29, 1998.

(Continued)

*Primary Examiner* — Helen Kwok
(74) *Attorney, Agent, or Firm* — Wolf, Greenfield & Sacks, P.C.

(57) ABSTRACT

A gyroscope control circuit for a vibratory gyroscope system includes an open-loop RSP control circuit and a closed-loop CSP control circuit. The gyroscope control circuit optionally may include a Q compensation circuit to compensate for variations in gyroscope sensitivity due to variations in resonator signal path Q. The resonator signal path and the Coriolis signal path may have transduction factors that are proportional to each other such that sensitivity of the gyroscope varies directly with resonator signal path quality factor (Q).

21 Claims, 5 Drawing Sheets

(56) References Cited

U.S. PATENT DOCUMENTS

| | | | | |
|---|---|---|---|---|
| 6,934,665 | B2* | 8/2005 | Rober | G01C 19/56 331/1 R |
| 7,188,522 | B2* | 3/2007 | Betz | G01C 19/56 73/1.37 |
| 7,219,529 | B2* | 5/2007 | Fell | G01C 19/567 702/116 |
| 7,253,615 | B2 | 8/2007 | Berkcan et al. | 324/244 |
| 7,640,803 | B1* | 1/2010 | Gutierrez | G01C 19/5719 73/504.04 |
| 7,980,133 | B2 | 7/2011 | Geen et al. | 73/504.04 |
| 8,151,641 | B2 | 4/2012 | Geen | 73/504.12 |
| 8,347,718 | B2* | 1/2013 | Malvern | G01C 19/5677 73/504.12 |
| 8,464,571 | B1 | 6/2013 | Sparks et al. | 73/1.38 |
| 8,616,055 | B2 | 12/2013 | Geen | 73/504.12 |
| 8,689,631 | B1 | 4/2014 | Tally et al. | 73/504.12 |
| 8,701,459 | B2 | 4/2014 | Geen | 73/1.38 |
| 9,176,165 | B2 | 11/2015 | Quer et al. | 73/649 |
| 2003/0101814 | A1* | 6/2003 | Challoner | G01C 19/5719 73/504.12 |
| 2005/0257596 | A1* | 11/2005 | Fell | G01C 19/567 73/1.37 |
| 2006/0201250 | A1* | 9/2006 | Kourepenis | G01C 19/5719 73/504.16 |
| 2007/0119258 | A1* | 5/2007 | Yee | G01C 19/5684 73/649 |
| 2009/0083011 | A1 | 3/2009 | Hao | 703/2 |
| 2009/0249875 | A1* | 10/2009 | Steinlechner | G01C 19/56 73/504.12 |
| 2009/0282916 | A1* | 11/2009 | Modugno | G01C 19/5776 73/504.12 |
| 2010/0212424 | A1* | 8/2010 | Malvern | G01C 19/5677 73/504.13 |
| 2011/0167891 | A1* | 7/2011 | Geen | G01C 25/005 73/1.38 |
| 2012/0006114 | A1 | 1/2012 | Caminada et al. | 73/504.12 |
| 2013/0098153 | A1* | 4/2013 | Trusov | G01C 19/5719 73/504.16 |
| 2014/0000366 | A1* | 1/2014 | Blomqvist | G01C 19/56 73/504.12 |
| 2015/0285658 | A1* | 10/2015 | Zotov | G01C 19/5776 73/1.77 |
| 2016/0298963 | A1 | 10/2016 | Kapusta et al. | G01C 19/56 |

OTHER PUBLICATIONS

Ayazi et al., "High Aspect-Ratio Combined Poly and Single-Crystal Silicon (HSRPSS) MEMS Technology;" Journal of Microelectromechanical Systems, vol. 9, No. 3, Sep. 2000.

Ayazi et al., "A HARPSS Polysilicon Vibrating Ring Gyroscope", Journal of Microelectromechanical Systems, vol. 10, No. 2, Jun. 2001.

Geen et al., "New iMEMS® Angular-Rate-Sensing Gyroscope", ADI Micromachined Products Division; Analog Dialogue 37-3, 2003.

Leland, "Adaptive Mode Tuning for Vibrational Syroscopes", IEEE Transaction on Control System Technology, vol. 11, No. 2, pp. 242-247, Mar. 2003.

Nguyen, "Micromechanical Resonators for Oscillators and Filters", IEEE Ultrasonics Symposium, vol. 1, pp. 489-499, Nov. 1995.

Oboe et al., "Control of a Z-Axis MEMS Vibrational Gyroscope", IEEE/ASME Transactions on Mechatronics, vol. 10, No. 4, pp. 364-370 , Aug. 2005.

Park et al., "Laterally Oscillated and Force-Balanced Micro Vibratory Rate Gyroscope Supported by Fish Hook Shape Springs", Proceedings of the IEEE 10th Annual International Workshop on Micro Electro Mechanical Systems, pp. 494-499, Jan. 1997.

Tang et al., "A Packaged Silicon MEMS Vibratory Gyroscope for Microspacecraft," Proceedings of the IEEE $10^{th}$ Annual International Workshop on Micro Electro Mechanical Systems, pp. 500-505, Jan. 1997.

Fan et al., "An Adaptive Feedback Circuit for MEMS Resonators", Journal of Micromechanics and Microengineering, IOP Publishing, vol. 21, 11 pages, Mar. 1, 2011.

Mathias et al., "Architecture for Integrated MEMS Resonators Quality Factor Measurement", DTIP of MEMS & MOEMS Conf., Stresa, Italy, EDA Publishing, 5 pages Apr. 25-27, 2007.

Ozdemir et al., "Measuring the Quality Factor in MEMS Devices", Micromachines, vol. 6, MDPI, pp. 1935-1945, Dec. 8, 2015.

Zeng et al., "An Energy-Efficient readout circuit for resonant sensors based on ring-down measurement (Review of Scientific Instruments", Review of Scientific Instruments, vol. 84, 2013 American Institute of Physics. 8 pages, Feb. 25, 2013.

Zhang et al., "High precision measurement of quality factor for MEMS Resonators", ScienceDirect, Procedia Chemistry, Vo. 1, Elsevier B.V., pp. 827-830, 2009.

International Searching Authority, International Search Report—International Application No. PCT/US2016/026385, dated Jul. 28, 2016, together with the Written Opinion of the International Searching Authority, 10 pages.

Intellectual Property Office of Great Britain, Examination Report—Application No. GB1604932.2, dated Oct. 12, 2016, 6 pages.

* cited by examiner

1

SYSTEM, APPARATUS, AND METHOD FOR RESONATOR AND CORIOLIS AXIS CONTROL IN VIBRATORY GYROSCOPES

FIELD OF THE INVENTION

The present invention relates generally to vibratory gyroscopes (e.g., MEMS vibratory gyroscopes) and more particularly to controlling the resonator signal path and Coriolis signal path in such vibratory gyroscopes.

BACKGROUND OF THE INVENTION

A vibratory gyroscope system is comprised of a sensor (gyroscope) that is used to sense rotation of some inertial mass with respect to a frame of reference, and some support circuitry. Operation of a vibratory gyroscope is based on the Coriolis effect. As such, the gyroscope has two orthogonal axes. Generally speaking, an inertial mass is driven to have some velocity along the first axis; further, the mass is typically a resonant structure and so this axis will be referred to as the Resonator axis. Due to the Coriolis effect, when the mass is rotated with respect to an observational reference frame, there will be a Coriolis force exerted along the second axis. The second axis is referred to as the Coriolis axis. The effect of the force on the Coriolis axis can be sensed and rotation can be calculated.

The support circuitry provides at least two functions. First, the support circuitry drives the mass into motion along the resonator axis. This circuitry, along with the gyroscope, is referred to as the Resonator Signal Path (RSP) or simply as the resonator. Second, the support circuitry senses a signal along the Coriolis axis. This circuitry, along with the gyroscope, is referred to as the Coriolis Signal Path (CSP) or as the accelerometer.

Many current vibratory gyroscopes use open-loop CSP and closed-loop RSP for robust sensitivity. This leaves the system sensitive to the quality factor of the gyroscope along the Coriolis axis. Then, the Resonator and Coriolis modes are intentionally split in frequency, so that the excitation of the Coriolis axis is off-resonance and the response is stable even in the presence of variation of the Coriolis axis Q. This approach works for low-Q resonators, when the mode split can be done at the factory and stays stable enough with life. For high-Q gyroscopes, this is not an acceptable solution, as the reduction in Q due to mode-splitting would undo the benefits of using a high-Q structure. Another solution would be to calibrate the Sensitivity over temperature. However, this is expensive, e.g., involving a multi-pass Automatic Test Equipment (ATE) test, and is less reliable.

SUMMARY OF EXEMPLARY EMBODIMENTS

In one exemplary embodiment, there is provided apparatus comprising a gyroscope control circuit for a vibratory gyroscope having a resonator mass and an accelerometer for generating a Coriolis output rate signal, where the gyroscope control circuit comprises a resonator signal path and a Coriolis signal path. The resonator signal path includes an open-loop resonator signal path control circuit configured to drive movement of the resonator mass based on a resonator sense signal without use of amplitude information contained in the resonator sense signal. The Coriolis signal path includes a closed-loop Coriolis signal path control circuit configured to produce the Coriolis output rate signal based on a Coriolis sense signal and to provide a feedback signal to the accelerometer based on the Coriolis sense signal.

In another exemplary embodiment, there is provided a gyroscope system comprising a gyroscope and a gyroscope control circuit. The gyroscope includes a resonator mass and an accelerometer for generating a Coriolis output signal. The gyroscope control circuit includes (a) a resonator signal path including an open-loop resonator signal path control circuit configured to drive movement of the resonator mass based on a resonator sense signal without use of amplitude information contained in the resonator sense signal and (b) a Coriolis signal path including a closed-loop Coriolis signal path control circuit configured to produce the Coriolis output rate signal based on a Coriolis sense signal and to provide a feedback signal to the accelerometer based on the Coriolis sense signal.

In various alternative embodiments, the gyroscope control circuit may further include a Q compensation circuit configured to compensate for variations in gyroscope sensitivity based on variations in resonator signal path Q while the gyroscope is operating. The Q compensation circuit may include a Q measurement circuit configured to measure the resonator signal path Q, in which case the Q compensation circuit may further include either a multiplier that combines the measured resonator signal path Q and the Coriolis output rate signal generated by the closed-loop Coriolis signal path control circuit to produce a compensated Coriolis output rate signal, or a feedback loop from the Q measurement circuit to the open-loop resonator signal path control circuit, wherein the open-loop resonator signal path control circuit is further configured to adjust a resonator drive signal based on the measured resonator signal path Q to reduce variations in resonator signal path Q. The Q measurement circuit may be configured to evaluate performance parameters of the resonator mass in response to different drive forces while the gyroscope is operational. The gyroscope may be mode-matched. The resonator signal path and the Coriolis signal path may have transduction factors that are proportional to each other such that sensitivity of the gyroscope varies directly with resonator signal path quality factor (Q).

In certain embodiments, the resonator control circuit is implemented on an ASIC wafer can be bonded to a separate MEMS wafer containing the gyroscope. In other embodiments, the resonator control circuit and the gyroscope are implemented on a common wafer.

In another exemplary embodiment, there is provided a method of operating a vibratory gyroscope having a resonator signal path including a resonator mass and having a Coriolis signal path including an accelerometer for generating a Coriolis output rate signal. The method comprises operating the resonator signal path using open-loop control in which movement of the resonator mass is driven based on a resonator sense signal without use of amplitude information contained in the resonator sense signal, and operating the Coriolis signal path using closed-loop control in which the Coriolis output rate signal is based on a Coriolis sense signal and a feedback signal is provided to the accelerometer based on the Coriolis sense signal.

In various alternative embodiments, the method may further involve measuring a resonator signal path quality factor (Q) and compensating for variations in gyroscope sensitivity based on variations in resonator signal path Q while the gyroscope is operating.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

As discussed in the background, a vibratory gyroscope system is comprised of a sensor (gyroscope) that is used to sense rotation of some inertial mass with respect to a frame of reference, and some support circuitry. Operation of a vibratory gyroscope is based on the Coriolis effect. As such, the gyroscope has two orthogonal axes. Generally speaking, an inertial mass is driven to have some velocity along the first axis; further, the mass is typically a resonant structure and so this axis will be referred to as the Resonator axis. Due to the Coriolis effect, when the mass is rotated with respect to an observational reference frame, there will be a Coriolis force exerted along the second axis. The second axis is referred to as the Coriolis axis. The effect of the force on the Coriolis axis can be sensed and rotation can be calculated.

The support circuitry provides at least two functions. First, the support circuitry drives the mass into motion along the resonator axis. This circuitry, along with the gyroscope, is referred to as the Resonator Signal Path (RSP) or simply as the resonator. Second, the support circuitry senses a signal along the Coriolis axis. This circuitry, along with the gyroscope, is referred to as the Coriolis Signal Path (CSP) or as the accelerometer.

Generally speaking, each signal path can be operated using one of three types of control mechanisms, which, for purposes of this patent application, will be referred to as "open" control, "open-loop" control, and "closed-loop" control. As used in this description and the accompanying claims, the following terms shall have the meanings indicated, unless the context otherwise requires:

An "open" RSP control mechanism or circuit (which may be referred to herein simply as "open RSP") drives motion of the mass without any feedback loop to regulate one or more parameters of system operation based on the driven motion of the mass. An example of RSP "open" control is a drive circuit that provides a drive signal (e.g., a fixed amplitude clock) to a set of drive electrodes to induce motion of the mass along the Resonator-axis without any type of feedback loop to adjust the drive signal based on sensed motion of the mass. Another example of RSP "open" control is shown in K. Y. Park, et al., "Laterally oscillated and force-balanced micro vibratory rate gyroscope supported by fish hook shape springs," *Proc. IEEE Micro Electro Mechanical Systems Workshop*, pp. 494-499, 1997 (hereinafter "the Park reference"), where Equation 5 describes a voltage applied to a set of drive electrodes (referred to as "prominence shape comb-drive" electrodes) with no mention of a feedback signal. It should be noted than in an open RSP, the frequency of excitation is determined only by the applied drive signal and is not necessarily related to the properties of the inertial mass.

Figure 1:
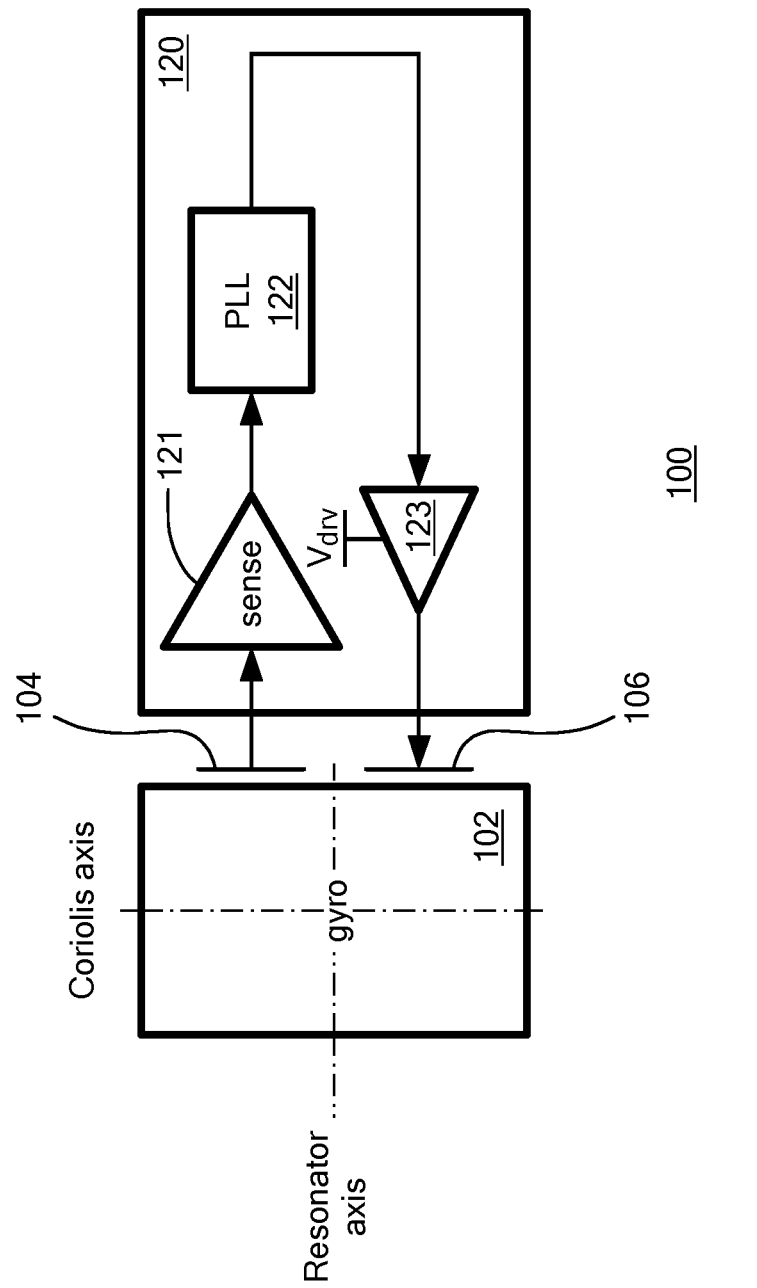
FIG. 1 is a schematic diagram showing a gyroscope system having a gyroscope and an exemplary open-loop RSP control circuit, as known in the art.

An "open-loop" RSP control mechanism or circuit (which may be referred to herein simply as "open-loop RSP") includes a feedback path to sustain oscillation of the mass without regulating the amplitude of oscillation or velocity of the mass. FIG. 1 is a schematic diagram showing a gyroscope system 100 having a gyroscope 102 and an exemplary open-loop RSP control circuit 120, as known in the art. The combination of the open-loop RSP control circuit 120 and the gyroscope 102 form a positive feedback loop in which the limit cycle behavior is used to sustain oscillation. The loop will sustain oscillation if the phase shift around the loop is equal to zero degrees. Thereby, the operation of the open-loop RSP is sensitive to phase shift in the gyroscope, which is a function of frequency. This property can be used to maintain oscillation exactly at resonant frequency of the gyroscope, in contrast to the operation of the open RSP. Specifically, signals from a set of resonator sense electrodes 104 are amplified by sense amplifier 121 and fed to a phased-lock loop (PLL) controller 122, which in turn sets the drive signal frequency and phase provided by drive amplifier 123 to a set of resonator drive electrodes 106. Because the open-loop RSP control circuit 120 does not regulate the amplitude or velocity of the resonator mass, it therefore is considered to be open-loop rather than closed-loop within the context of this patent application even though it includes a feedback loop. It also is prior art to use a positive feedback loop to drive the Resonator-axis at resonance, for example, as in C. T.-C. Nguyen, "Micromechanical resonators for oscillators and filters," *Proc. IEEE Ultrasonics Symposium*, pp. 489-499, 1995. Within the context of this patent application, Nguyen's RSP control circuit is considered to be open-loop RSP because the use of positive feedback here is simply to maintain oscillation (i.e. to replace energy lost due to damping and resistance).

An "open-loop" CSP control mechanism or circuit (which may be referred to herein simply as "open-loop CSP") senses motion of the mass without any feedback loop to regulate one or more parameters of system operation based on the sensed motion of the mass. An example of CSP "open" control is a sense circuit that processes a sense signal from the accelerometer with no feedback loop back to the accelerometer, such as for bringing an accelerometer proof mass (which may be a resonant mass of the RSP or may be a separate mass) back to a nominal position along the Coriolis-axis. Open-loop CSP is the traditional way to read out the Coriolis signal, for example, as in F. Ayazi, K. Najafi, "Design and fabrication of high-performance polysilicon vibrating ring gyroscope," *Proc. IEEE Micro Electro Mechanical Systems Workshop*, pp. 621-626, 1998 (hereinafter "the Ayazi reference"). In this case, sense electronics observe any changes in the gyroscope along the Coriolis axis (in this case, changes in capacitance). The Ayazi reference also seems to describe open-loop RSP, in which the Resonator-axis is driven with a sinusoidal electrostatic force via the drive electrodes. Presumably, this excitation is near the resonant frequency of the Resonator-axis (therein described as the primary mode).

Figure 2:
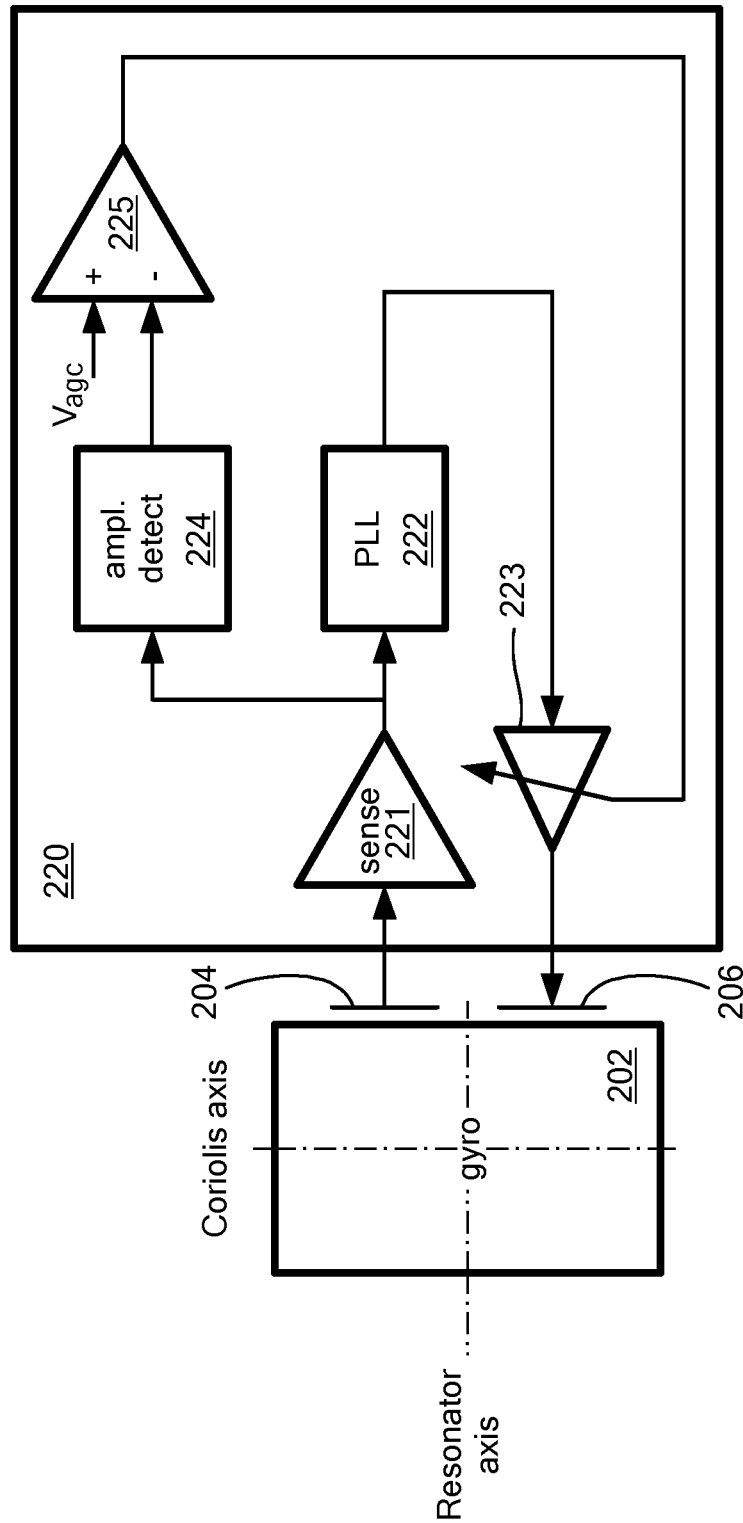
FIG. 2 is a schematic diagram showing a gyroscope system having a gyroscope and an exemplary closed-loop RSP control circuit, as known in the art.

A "closed-loop" RSP control mechanism or circuit (which may be referred to herein simply as "closed-loop RSP") includes a negative feedback circuit for velocity amplitude control of the resonator. FIG. 2 is a schematic diagram showing a gyroscope system 200 having a gyroscope 202 and an exemplary closed-loop RSP control circuit 220, as known in the art. The closed-loop RSP control circuit 220 includes a feedback loop that senses both the resonating frequency of the resonator mass and the amplitude of the resonance and regulates the drive signal provided by the drive amplifier 223 to a set of resonator drive electrodes 206 so as to maintain a fixed amplitude at the sense amplifier 221 output. Specifically, signals from a set of resonator sense electrodes 204 are amplified by sense amplifier 221. The output from the sense amplifier 221 is provided to both a phased-lock loop (PLL) controller 222 and an amplitude detector 224. The PLL 222 sets the drive signal frequency and phase for drive amplifier 223, while the amplitude detector 224 output is combined with an automatic gain control voltage (Vagc) to adjust the output voltage of the drive amplifier 223. The output of the drive amplifier 223 is provided to a set of resonator drive electrodes 206. Because the closed-loop RSP control circuit 220 regulates the amplitude or velocity of the resonator mass, it therefore is considered to be closed-loop within the context of this patent application. It also is prior art to add an amplitude control element to the Resonator axis, for example, as in T. K. Tang, et al., "A packaged silicon MEMS vibratory gyroscope for microspacecraft," *Proc. IEEE Micro Electro Mechanical Systems Workshop*, pp. 500-505, 1997 (hereinafter "the Tang reference") also adds an amplitude control element to the Resonator-axis. Within the context of this patent application, Tang's amplitude control element is considered closed-loop RSP because a negative feedback loop is used to servo the peak displacement of the mass along the Resonator axis. It is also prior art to use negative feedback (closed-loop RSP) to control RSP parameters other than the peak displacement. For example, closed-loop RSP can be used to control the resonant frequency, as in R. Leland, "Adaptive mode tuning for vibrational gyroscopes," *IEEE Trans. on Control Systems Technology*, vol. 11, no. 2, pp. 242-247, March 2003.

Figure 3:
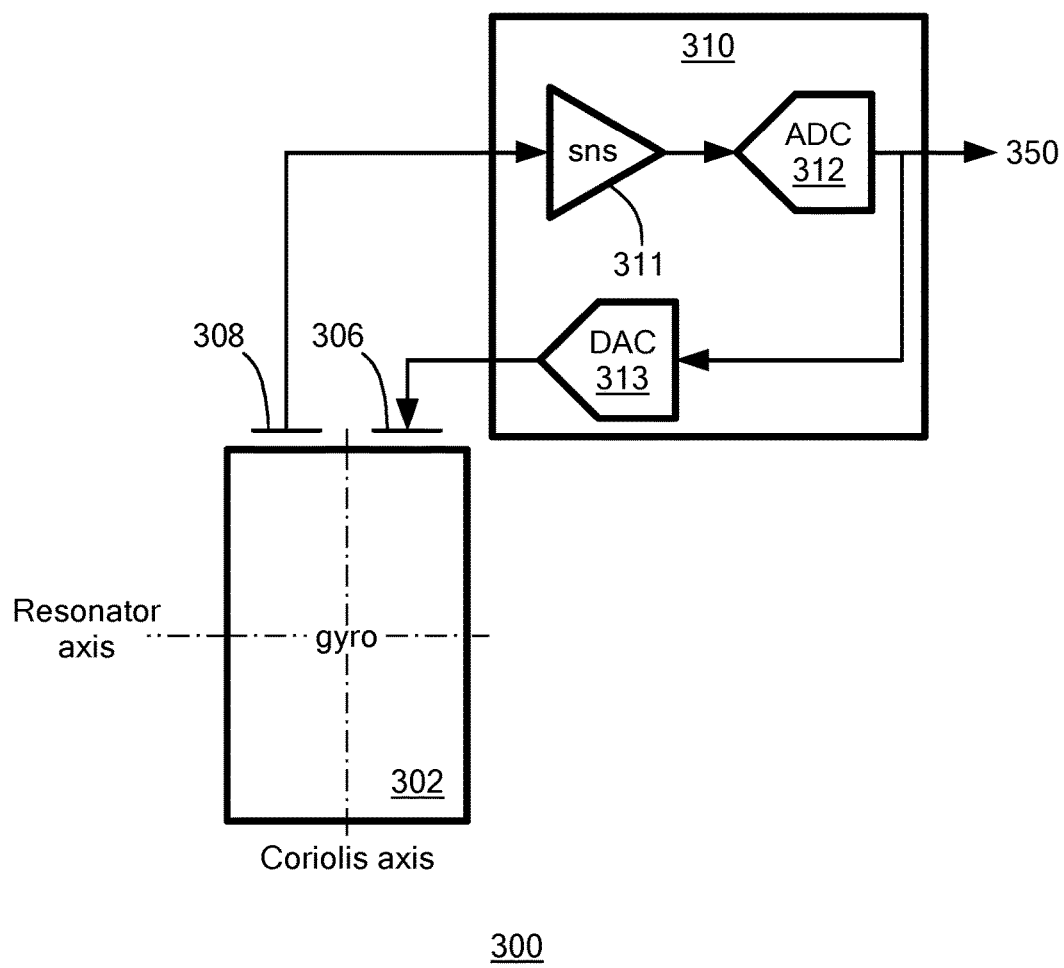
FIG. 3 is a schematic diagram showing a gyroscope system having a gyroscope and an exemplary closed-loop CSP control circuit, as known in the art.

A "closed-loop" CSP control mechanism (which may be referred to herein simply as "closed-loop CSP") includes a force-feedback circuit in which electrostatic force is applied along the Coriolis axis to balance the Coriolis force. FIG. 3 is a schematic diagram showing a gyroscope system 300 having a gyroscope 302 and an exemplary closed-loop CSP control circuit 310, as known in the art. The closed-loop CSP control circuit 310 includes a feedback loop that senses displacement of the mass along the Coriolis axis and adjusts the feedback signal to maintain the mass at its natural position. Specifically, signals from a set of Coriolis-axis sense electrodes 308 are amplified by sense amplifier 311 and converted to a digital value by analog-to-digital converter (ADC) 312. This digital value represents the output rate signal 350 for the gyroscope system 300 and also is fed back via a digital-to-analog converter (DAC) to a set of Coriolis-axis drive electrodes 306. The Park reference also provides an example of closed-loop CSP control.

A "set" contains one or more elements. As used within the context of this patent application, a set of electrodes can include one electrode or can include multiple electrodes.

In some contexts, the term "gyroscope" is used to refer to the mechanical gyroscope structures of a gyroscope system, such as a resonator mass, an accelerometer proof mass (which may be the resonator mass itself or a separate mass), and various sets of electrodes that are used for driving motion of the resonator mass, sensing motion of the accelerometer proof mass, and typically also other functions (e.g., sensing motion of the resonator mass such as for open-loop RSP or closed-loop RSP control and/or applying forces to the accelerometer proof mass such as for closed-loop CSP control). In other contexts, the term "gyroscope" is used generally to refer to the entire gyroscope system including the mechanical gyroscope structures and an associated gyroscope control circuit.

The main advantage of using open or open-loop control mechanisms is simplicity. However, mechanical systems such as gyroscopes often are inherently unstable and will often vary with temperature changes or environmental stresses. The main advantage of using closed-loop control mechanisms is that variation in particular parameter(s) can be controlled, such as the effects of temperature or environmental stresses. With a typical negative feedback configuration, one cares only that the loop gain is much greater than unity. In this case, the closed-loop gain will depend on a feedback factor.

As discussed in the background, many current vibratory gyroscopes use open-loop CSP and closed-loop RSP for robust sensitivity. This leaves the system sensitive to CSP Q. Then, the Resonator and Coriolis modes are intentionally split in frequency, so that the excitation of the Coriolis axis is off-peak and not sensitive to Coriolis Q. This approach works for low-Q resonators, when the mode split can be done at the factory and stays stable enough with life. For high-Q gyroscopes, this is not an acceptable solution, as the reduction in Q due to mode-splitting would undo the benefits of using a high-Q structure. Another solution would be to calibrate the Sensitivity over temperature. However, this is expensive, e.g., involving a multi-pass Automatic Test Equipment (ATE) test, and is less reliable.

It is also known to use both closed-loop RSP and CSP simultaneously, for example, as in R. Oboe, E. Lasalandra, "Control of a z-axis MEMS vibrational gyroscope," *IEEE/ASME Trans. on Mechatronics*, vol. 10, no. 4, pp. 364-370, August 2005. In this configuration, the system is not sensitive to Q, but is sensitive to the transduction mechanisms in the feedback paths; for example, the transduction from a feedback voltage to a mechanical force applied to the gyroscope. Many gyroscope systems have transduction mechanisms that are very sensitive to environmental stresses.

In embodiments of the present invention, a gyroscope control circuit for a vibratory gyroscope system includes an open-loop RSP control circuit and a closed-loop CSP control circuit. To the best of the inventor's knowledge, this combination of open-loop RSP and closed-loop CSP has not been used in vibratory gyroscopes but can advantageous, as discussed below.

Typically (although not required), the gyroscope will be mode-matched. Mode-matching can be performed in any of a variety of ways. For example, the gyroscope mechanical structures may be designed so that the resonator and Coriolis axis modes are matched, or the gyroscope control circuit can include a mode-matching servo (e.g., as described in U.S. Pat. No. 8,151,641 and in U.S. Pat. No. 8,616,055, which were commonly owned with the subject patent application at the time of filing and are hereby incorporated herein by reference in their entireties).

With closed-loop CSP, the gain (from Coriolis force to CSP output) is a function of a transduction factor $Y^{-1}$ (from voltage to force), if the loop gain is much greater than unity. Therefore, the CSP gain is not dependent on sensor quality factor Q, so long as Q and any other CSP gain are sufficiently large. The following equations provide an estimate of Sensitivity for closed-loop CSP, in accordance with one exemplary embodiment.

The Coriolis force ($F_{COR}$) can be represented as follows:

$$F_{COR} = 2mA_g\Omega_z \text{vel}_{RES}$$

where:
$A_g$=angular gain;
m=mass; and
$\text{vel}_{RES}$=Resonator-axis velocity.

The Feedback force ($F_{FB}$) can be represented as follows:

$$F_{FB} = D_{out}V_{dac}V_b dC/dx$$

where:
$D_{out}$=output bit;
$V_{dac}$=DAC full-scale;
$V_b$=bias across feedback electrode gap; and
$dC/dx$=change in capacitance with displacement.

Feedback works by equating the Feedback force with the Coriolis force. Rearranging for sensitivity (S) results in:

$$S = D\text{out}/\Omega_z = (2mA_g dx\text{vel}_{RES})/(V_{dac}V_b dC).$$

With open-loop RSP, the velocity of the mass is a function of the product of a transduction factor X (from voltage to force), and sensor quality factor Q (i.e., translates from force to velocity). The following equations provide an estimate of resonator velocity for open-loop RSP, in accordance with one exemplary embodiment.

The fixed drive transduced to force (FRES) can be represented as:

$$F_{RES} = V_{rd}V_b dC/dx$$

where:
$V_{rd}$=resonator drive voltage.

This force translates to velocity (velRES) as follows:

$$\text{vel}_{RES} = (Q_r F_{RES})/(m\omega_r)$$

where:
m=Resonator mass;
$\omega_r$=Resonator-axis resonance; and
Qr=Resonator-axis quality factor.

Combining these equations results in:

$$\text{velRES} = (Q_r/m\omega_r)V_{rd}V_b dC/dx$$

It should be noted that the above equations assume parallel plate transduction (i.e., for a given axis, $dC/dx = \epsilon A/g^2$, where g is the electrode gap and A is the electrode area), although the results would be very similar if all transductions were replaced with comb fringing (i.e., $dC/dx = y\epsilon h/g$ where "y" represents the fringing portion of the electric field).

The Coriolis effect describes a force that is proportional to the product of rotation rate and the RSP velocity. This Coriolis force is then processed by the CSP to generate the output signal. Typically (although not necessarily), transduction factors X and Y are proportional to each other, assuming the CSP and RSP use like methods for electrostatic actuation (e.g., both use similar comb electrodes or both use similar parallel plate electrodes). Thus, using open-loop RSP and closed-loop CSP as described above, the overall system Sensitivity (from input rotation to CSP output) is related to the product of X, $Y^{-1}$, and Resonator-axis Q, as follows:

$$S = 2A_g \left(\frac{A_{rd}}{A_{cd}}\right)\left(\frac{V_{rd}}{V_{dac}}\right)\left(\frac{g_{cd}}{g_{rd}}\right)^2 \frac{Q_r}{\omega_r}$$

where:
$g_{cd}$=Coriolis-axis force feedback electrode gap;
$A_{cd}$=Coriolis-axis force feedback electrode area;
$g_{rd}$=Resonator-axis drive electrode gap; and
$A_{rd}$=Resonator-axis drive electrode area.

Thus, system sensitivity depends on the Resonator-axis Q (e.g., Sensitivity will vary with $Q_r$ in the above equation). Assuming transduction factors X and Y are proportional to each other such that the product of X and $Y^{-1}$ is substantially constant, the system Sensitivity essentially depends on only the Resonator-axis Q (e.g., Sensitivity will vary directly with $Q_r$ in the above equation).

Therefore, in order to make system Sensitivity robust with respect to environmental variations, certain alternative embodiments additionally include a compensation circuit to adjust for variation in Resonator-axis quality factor (Q). Variation in Resonator-axis Q can be adjusted by the compensation circuit in a variety of ways.

In certain embodiments, the compensation circuit is configured to measure an estimate of Resonator-axis Q and to perform post-processing correction based on the measured estimate of Resonator-axis Q. Resonator-axis Q can be measured, for example, using a chirping, sweeping, or curve fitting technique as known in the art. In a phased-lock loop system, Q can be measured, for example, from the frequency shift induced by a 45 degree phase shift switched into the resonance feedback from a tap in the binary divider chain. Alternatively, Q can be measured from the amplitude change induced by known frequency shifts from resonance (e.g., measuring the amplitude of the resonating mass at the resonance frequency and also at the resonance frequency +/−5%) or by the reciprocal of the relative −3 dB bandwidth. U.S. Pat. No. 8,701,459 also describes techniques for measuring Resonator-axis Q; this patent was commonly owned with the subject patent application at the time of filing and is hereby incorporated herein by reference in its entirety.

Resonator-axis Q also can be measured using techniques described in related U.S. Provisional Patent Application No. 62/144,126 entitled Quality Factor Estimation for Resonators filed on even date herewith, which is hereby incorporated herein by reference in its entirety. Here, measuring the quality factor of an oscillating MEMS resonator includes evaluating performance parameters of the resonator in response to different drive forces while the gyroscope is operational. For example, the compensation circuit may alternate between a first phase in which the resonator is driven into oscillation by applying a drive signal having a first amplitude and having a first duration and then measuring a parameter of the motion of the resonator at a first time during application of the drive signal at the first amplitude, and a second phase in which the resonator is driven by applying the drive signal at a second amplitude less than the first amplitude and then re-measuring the parameter of the motion of the resonator at a second time during application of the drive signal at the second amplitude. By way of example, in some embodiments the parameter of the motion of the resonator is the amplitude of the motion of the resonator. In other embodiments, the parameter of the motion of the resonator is the velocity of the resonator, and in yet other embodiments the parameter of the motion of the resonator is a current flow proportional to the velocity of the resonator.

Figure 4:
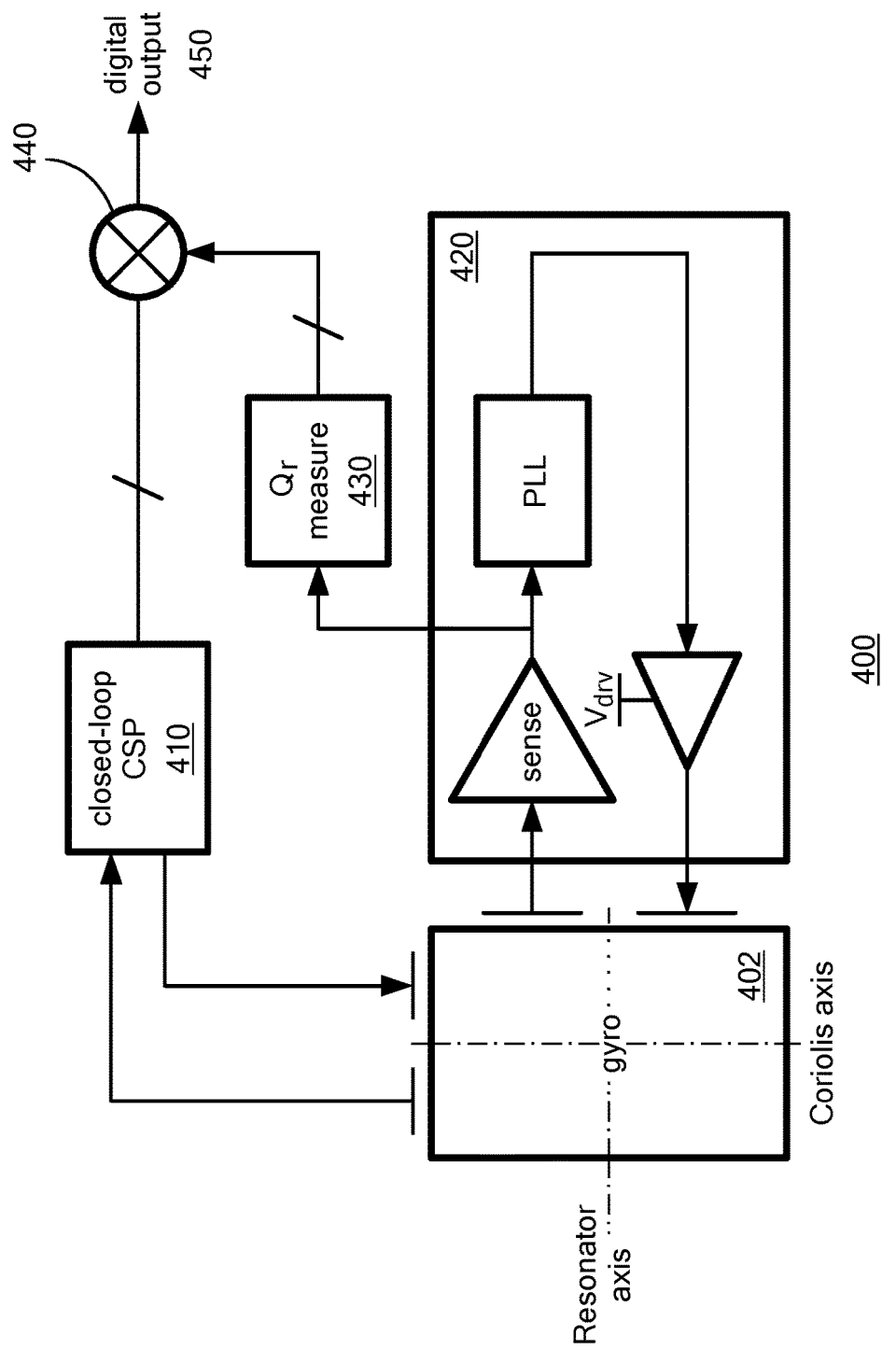
FIG. 4 is a schematic diagram showing a gyroscope system including a gyroscope and a gyroscope control circuit having a Q compensation circuit configured to perform post-processing correction based on a measured estimate of Resonator-axis Q, in accordance with one specific exemplary embodiment.

FIG. 4 is a schematic diagram showing a gyroscope system 400 including a gyroscope 402 and a gyroscope control circuit having a Q compensation circuit configured to perform post-processing correction based on the measured estimate of Resonator-axis Q, in accordance with one specific exemplary embodiment. Here, the gyroscope control circuit includes a closed-loop CSP control circuit 410 (e.g., of the type shown in FIG. 3), an open-loop RSP control circuit 420 (e.g., of the type shown in FIG. 1), and a Q compensation circuit having a Q measurement circuit 430 that measures the Resonator-axis Q on an ongoing basis. The Q compensation circuit also includes a multiplier 440 that combines the measured Resonator-axis Q from the Q measurement circuit 430 with the Coriolis output signal generated by the closed-loop CSP control circuit 410 to produce the output rate signal 450.

In certain alternative embodiments, the compensation circuit is configured to additionally adjust the RSP drive in order to compensate for Q variation, i.e., to try to maintain a constant Resonator-axis velocity over a range of operating parameters (e.g., temperature). Note that this would still be open-loop RSP because changes in the drive voltage would not affect the Q of the gyroscope; hence, there is no feedback loop.

Figure 5:
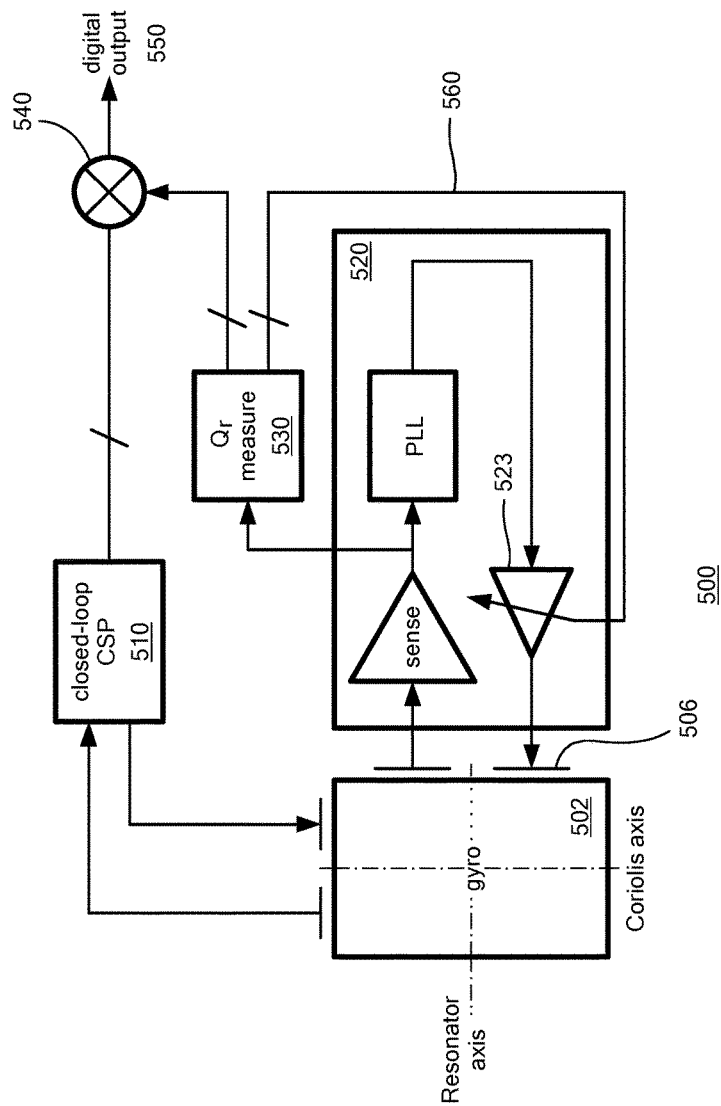
FIG. 5 is a schematic diagram showing a gyroscope system including a gyroscope and a gyroscope control circuit having a Q compensation circuit configured to adjust the RSP drive in order to compensate for Resonator-axis Q variation, in accordance with one specific exemplary embodiment.

FIG. 5 is a schematic diagram showing a gyroscope system 500 including a gyroscope 502 and a gyroscope control circuit having a Q compensation circuit configured to adjust the RSP drive in order to compensate for Resonator-axis Q variation, in accordance with one specific exemplary embodiment. Here, the gyroscope control circuit includes a closed-loop CSP control circuit 510 (e.g., of the type shown in FIG. 3), an open-loop RSP control circuit 520 (e.g., of the type shown in FIG. 1), and a Q compensation circuit having a Q measurement circuit 530 that measures the Resonator-axis Q on an ongoing basis. The Q compensation circuit also includes a multiplier 540 that combines the measured Resonator-axis Q from the Q measurement circuit 530 with the Coriolis output signal generated by the closed-loop CSP control circuit 510 to produce the output rate signal 550. The Q compensation circuit additionally includes a feedback loop 560 to adjust the drive signal generated by the drive amplifier 523 and provided to the set of resonator drive electrodes 506 based on the measured Resonator-axis Q from the Q measurement circuit 530.

It should be noted that open-loop CSP and closed-loop RSP, such as in the Tang reference discussed above, is similar, except that the system sensitivity will be proportional to Coriolis-axis Q. However, correcting for Coriolis-axis Q is more difficult because, unlike the resonator-axis, the Coriolis-axis generally is not continuously excited during normal operation of the gyroscope, as its excitation depends on rotation of the device.

It should be noted that gyroscope control circuits of the type described above may be implemented in devices separate from the mechanical gyroscope components (e.g., the gyroscope control circuit may be formed on an ASIC wafer that is later bonded to a separate MEMS wafer containing the mechanical gyroscope structures) or may be implemented in the same device as the mechanical gyroscope components (e.g., the gyroscope control circuit and the mechanical gyroscope structures may be formed on a common wafer such as in an integrated MEMS process). Thus, embodiments of the present invention can include both a gyroscope control circuit alone and a gyroscope system including such a gyroscope control circuit in combination with the mechanical gyroscope structures.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions. Thus, the type of arrow used in a particular drawing to represent a particular activity is exemplary and should not be seen as limiting.

The gyroscope control circuits described above may be embodied in many different forms and may include a processor (e.g., a microprocessor, microcontroller, digital signal processor, or general purpose computer) with associated computer program logic, a programmable logic device (e.g., a Field Programmable Gate Array (FPGA) or other PLD) with associated programmable logic, discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM, a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the gyroscope control circuits described herein) are necessarily non-conventional because, absent special programming or configuration, the conventional components do not inherently perform the described non-conventional methods.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. Apparatus comprising a gyroscope control circuit for a vibratory gyroscope having a resonator mass and an accelerometer for generating a Coriolis output rate signal, the gyroscope control circuit comprising:
   a resonator signal path including an open-loop resonator signal path control circuit configured to drive movement of the resonator mass based on a resonator sense signal without use of amplitude information contained in the resonator sense signal; and
   a Coriolis signal path including a closed-loop Coriolis signal path control circuit configured to produce the Coriolis output rate signal based on a Coriolis sense signal and to provide a feedback signal to the accelerometer based on the Coriolis sense signal; and
   a quality factor compensation circuit configured to compensate for variations in gyroscope sensitivity based on variations in a resonator signal path quality factor while the gyroscope is operating.

2. The apparatus according to claim 1, wherein the quality factor compensation circuit comprises:
   a quality factor measurement circuit configured to measure the resonator signal path quality factor.

3. The apparatus according to claim 2, wherein the quality factor compensation circuit further comprises:
   a multiplier that combines the measured resonator signal path quality factor and the Coriolis output rate signal generated by the closed-loop Coriolis signal path control circuit to produce a compensated Coriolis output rate signal.

4. The apparatus according to claim 2, wherein the quality factor compensation circuit further comprises a feedback loop from the quality factor measurement circuit to the open-loop resonator signal path control circuit, wherein the open-loop resonator signal path control circuit is further configured to adjust a resonator drive signal based on the measured resonator signal path quality factor to reduce variations in the resonator signal path quality factor.

5. The apparatus according to claim 2, wherein the quality factor measurement circuit is configured to evaluate performance parameters of the resonator mass in response to different drive forces while the gyroscope is operational.

6. The apparatus according to claim 1, wherein the gyroscope is mode-matched.

7. The apparatus according to claim 1, wherein the resonator signal path and the Coriolis signal path have transduction factors that are proportional to each other such that sensitivity of the gyroscope varies directly with resonator signal path quality factor (Q).

8. The apparatus according to claim 1, further comprising an ASIC wafer, wherein the open-loop resonator signal path control circuit is formed on the ASIC wafer.

9. A gyroscope system comprising:
   a gyroscope including a resonator mass and an accelerometer for generating a Coriolis output rate signal; and
   a gyroscope control circuit including (a) a resonator signal path including an open-loop resonator signal path control circuit configured to drive movement of the resonator mass based on a resonator sense signal without use of amplitude information contained in the resonator sense signal and (b) a Coriolis signal path including a closed-loop Coriolis signal path control circuit configured to produce the Coriolis output rate signal based on a Coriolis sense signal and to provide a feedback signal to the accelerometer based on the Coriolis sense signal and (c) a quality factor compensation circuit configured to compensate for variations in gyroscope sensitivity based on variations in a resonator signal path quality factor while the gyroscope is operating.

10. The gyroscope system according to claim 9, wherein the quality factor compensation circuit comprises:
a quality factor measurement circuit configured to measure the resonator signal path quality factor.

11. The gyroscope system according to claim 10, wherein the quality factor compensation circuit further comprises:
a multiplier that combines the measured resonator signal path quality factor and the Coriolis output rate signal generated by the closed-loop Coriolis signal path control circuit to produce a compensated Coriolis output rate signal.

12. The gyroscope system according to claim 10, wherein the quality factor compensation circuit further comprises a feedback loop from the quality factor measurement circuit to the open-loop resonator signal path control circuit, wherein the open-loop resonator signal path control circuit is further configured to adjust a resonator drive signal based on the measured resonator signal path quality factor to reduce variations in the resonator signal path quality factor.

13. The gyroscope system according to claim 10, wherein the quality factor measurement circuit is configured to evaluate performance parameters of the resonator mass in response to different drive forces while the gyroscope is operational.

14. The gyroscope system according to claim 9, wherein the gyroscope is mode-matched.

15. The gyroscope system according to claim 9, wherein the resonator signal path and the Coriolis signal path have transduction factors that are proportional to each other such that sensitivity of the gyroscope varies directly with a resonator signal path quality factor (Q).

16. The gyroscope system according to claim 9, wherein the open-loop resonator signal path control circuit is implemented on an ASIC wafer, and wherein the gyroscope is implemented on a separate MEMS wafer bonded to the ASIC wafer.

17. The gyroscope system according to claim 9, wherein the open-loop resonator signal path control circuit and the gyroscope are implemented on a common wafer.

18. A method of operating a vibratory gyroscope having a resonator signal path including a resonator mass and having a Coriolis signal path including an accelerometer for generating a Coriolis output rate signal, the method comprising:
operating the resonator signal path using open-loop control in which movement of the resonator mass is driven based on a resonator sense signal without use of amplitude information contained in the resonator sense signal;
operating the Coriolis signal path using closed-loop control in which the Coriolis output rate signal is based on a Coriolis sense signal and a feedback signal is provided to the accelerometer based on the Coriolis sense signal;
measuring a resonator signal path quality factor (Q); and
compensating for variations in gyroscope sensitivity based on variations in the resonator signal path quality factor while the gyroscope is operating.

19. The method according to claim 18, wherein compensating for variations in gyroscope sensitivity based on variations in the resonator signal path quality factor while the gyroscope is operating comprises:
combining the measured resonator signal path quality factor and the Coriolis output rate signal to produce a compensated Coriolis output rate signal.

20. The method according to claim 18, further comprising:
adjusting a resonator drive signal based on the measured resonator signal path quality factor to reduce variations in the resonator signal path quality factor.

21. The method according to claim 18, further comprising:
evaluating performance parameters of the resonator mass in response to different drive forces while the gyroscope is operational.

* * * * *